(12) United States Patent
Horton et al.

(10) Patent No.: US 11,322,159 B2
(45) Date of Patent: May 3, 2022

(54) CALLER IDENTIFICATION IN A SECURE ENVIRONMENT USING VOICE BIOMETRICS

(71) Applicants: Andrew Horton, Sarasota, FL (US); Sebastian Mascaro, Championsgate, FL (US)

(72) Inventors: Andrew Horton, Sarasota, FL (US); Sebastian Mascaro, Championsgate, FL (US)

( * ) Notice: Subject to any disclaimer, the term of this patent is extended or adjusted under 35 U.S.C. 154(b) by 28 days.

(21) Appl. No.: 16/926,596

(22) Filed: Jul. 10, 2020

(65) Prior Publication Data

US 2020/0411013 A1 Dec. 31, 2020

Related U.S. Application Data

(63) Continuation-in-part of application No. 16/715,938, filed on Dec. 16, 2019, now abandoned, which is a continuation of application No. 15/330,977, filed on Aug. 19, 2016, now Pat. No. 10,511,712.

(60) Provisional application No. 62/277,957, filed on Jan. 12, 2016.

(51) Int. Cl.
*G10L 17/22* (2013.01)
*H04M 3/42* (2006.01)
*H04M 3/537* (2006.01)
*G10L 17/04* (2013.01)
*G10L 17/06* (2013.01)

(52) U.S. Cl.
CPC ............. *G10L 17/22* (2013.01); *G10L 17/04* (2013.01); *G10L 17/06* (2013.01); *H04M 3/537* (2013.01); *H04M 3/42025* (2013.01); *H04M 2203/6054* (2013.01); *H04M 2250/74* (2013.01)

(58) Field of Classification Search
CPC .......... H04M 3/42068; H04M 3/2281; H04M 3/537; H04M 2203/6054; H04M 2250/74; H04M 3/42025; G10L 17/00; G10L 17/04; G10L 17/06; G10L 17/22
See application file for complete search history.

(56) References Cited

U.S. PATENT DOCUMENTS

| 6,101,242 | A | * | 8/2000 | McAllister | H04Q 3/0045 379/201.02 |
| 7,106,843 | B1 | * | 9/2006 | Gainsboro | H04M 3/2281 455/411 |
| 7,333,798 | B2 | * | 2/2008 | Hodge | G06F 16/24575 455/410 |
| 7,403,766 | B2 | * | 7/2008 | Hodge | G06K 19/10 455/418 |

(Continued)

*Primary Examiner* — Lisa Hashem
(74) *Attorney, Agent, or Firm* — Ziegler IP Law Group, LLC

(57) ABSTRACT

A method for passive enrollment and identification of one or more speakers in an audio file includes automatically converting audio data to a format suitable for biometric processing, separating different channels present in the converted audio data separating speakers in the converted audio data, generating audio files specific to individual speakers in the converted audio data, iteratively grouping the audio files of individual speakers according to a predetermined matching criteria, creating biometric voice prints from the groups of audio files, and authenticating speakers in the biometric voice prints by comparing the biometric voice prints to entries in a biometric voice print database.

20 Claims, 7 Drawing Sheets

(56) References Cited

U.S. PATENT DOCUMENTS

| | | | | |
|---|---|---|---|---|
| 7,721,109 B1* | 5/2010 | Herder | ............... | G07F 7/10 |
| | | | | 705/64 |
| 7,881,446 B1* | 2/2011 | Apple | ............... | H04M 15/08 |
| | | | | 379/127.05 |
| 8,582,738 B1* | 11/2013 | Keiser | ............... | H04M 3/42102 |
| | | | | 379/114.14 |
| 8,798,035 B1* | 8/2014 | Passe | ............... | H04L 12/66 |
| | | | | 370/252 |
| 9,225,701 B2* | 12/2015 | Gongaware | ............... | H04M 3/38 |
| 9,560,193 B1* | 1/2017 | Hogg, Jr. | ............... | H04M 3/42348 |
| 9,609,121 B1* | 3/2017 | Hodge | ............... | H04N 7/141 |
| 9,721,571 B2* | 8/2017 | Lousky | ............... | G10L 17/04 |
| 10,129,392 B1* | 11/2018 | Hodge | ............... | G10L 25/51 |
| 2001/0036821 A1* | 11/2001 | Gainsboro | ............... | H04M 3/36 |
| | | | | 455/410 |
| 2011/0082874 A1* | 4/2011 | Gainsboro | ............... | G10L 15/26 |
| | | | | 707/769 |
| 2018/0213082 A1* | 7/2018 | Hodge | ............... | G06F 16/5854 |

* cited by examiner

CALLER IDENTIFICATION IN A SECURE ENVIRONMENT USING VOICE BIOMETRICS

BACKGROUND

This application generally relates to a system and method for identifying callers in secure environments, such as correctional facilities, by using voice biometrics, wherein the identity of speakers in both directions in calls originating either inside or outside the facility are of great interest to the management of such facilities. The term "system" as used herein comprises both hardware and at least one software algorithm.

There is an increasing need to identify callers and to monitor communications in controlled environments, such as corrections facilities, military bases, or government institutions, referred to collectively as secure facilities. Voice identification systems are needed when the speaker is not otherwise known. The disclosed embodiments will materially contribute to countering terrorism from increased detection and surveillance of unauthorized telephone calls within secure facilities such as prisons or other government facilities. The proliferation of unauthorized cellular telephone in prisons increases the chance that high-risk inmates may continue to plan illegal activities even while in detention. Traditional means of monitoring of all telephone traffic may be impractical, may infringe civil liberties of non-inmates, or may simply be ineffective. Only a small portion of telephone calls between inmates and the outside are actually monitored because of limited resources.

Prior art solutions providing caller identification using voice biometrics have limitations. Prior art formal enrolment of users is an especially cumbersome and time-consuming process because a reliable prior art enrolment requires a substantial amount of speech to be captured and typically requires cooperation of the caller. To date, this has limited the adoption of voice biometrics as a means of telephone-based authentication in secure facilities.

Systems of the prior art typically compare a voice sample from the speaker against an existing library of previously-acquired and archived Biometric Voice Prints (BVPs). Verification typically occurs only at the beginning of an interaction and, once achieved, is considered as valid for the whole interaction. This does not allow for instances wherein the validation of the individual's identity can be completed correctly, but the interaction is then taken up by another party. This is a serious potential flaw for those interactions requiring a very high standard of identity verification.

What is needed is a voice recognition system that monitors the identity of the actual speakers continuously over the lifetime of a call originated in either direction.

US Patent application 2013/0044867 to Walters et al. teaches the use of voice biometric software to analyze inmate telephone calls. A system and method for managing and controlling telephone activity in a correctional facility comprises providing a first communicative connection between a caller and a recipient, delivering the conversation between the caller and the recipient over the first communicative connection and executing voice biometrics software to evaluate the conversation. A detection response is executed based upon the evaluation of the biometrics software.

Incorporated U.S. Pat. No. 9,237,232 to Williams et al. discloses systems and methods for analyzing digital recordings of the human voice in order to find characteristics unique to an individual. A biometrics engine may use an analytics service in a contact center to supply audio streams based on configured rules and providers for biometric detection. The analytics service may provide ca audio data and attributes to connected engines based on a provider-set of selection rules. The connected providers send call audio data and attributes through the analytics service. The engines are notified when a new call is available for processing and can then retrieve chunks of audio data and call attributes by polling an analytics service interface. A mathematical model of the human vocal tract in the call audio data is created and/or matched against existing models. The result is analogous to a fingerprint, i.e., a pattern unique to an individual to within some level of probability.

The system has no disclosed capability for continuously monitoring the identity of the caller over the lifetime of a call, nor for ensuring that the same persons are talking through the call, nor to generate an alert if another party is added to the call. Further, the system is directed to identifying an incoming caller but makes no provision for identifying the receiving party as well, which can be vital within a secure environment such as a prison. Further, the system is not configured for identification of persons outside a secure environment who are receiving calls from within the secure environment.

Systems of the prior art are also limited in their focus on the calling party as opposed to the called party. Inmates, in particular, are generally allowed to call only a restricted list of phone numbers, typically family or friends. No prior art system currently is able to verify the identity of the called party, which could be a major source of fraud.

In current systems, calls are typically initiated by the inmate to the outside world. However, there is a need for telephone systems that can identify callers from the outside while allowing such callers to initiate calls and leave voicemails for inmates, although the practical impossibility of formally enrolling every potential caller has prevented the deployment of such solutions.

Currently, biometric identification is not used in voicemail systems as part of communications networks in secure facilities in part because of the difficulty in identifying callers. This is a major security risk since most of the communication allowed in a correctional environment is based on the premise that the facility always knows who is involved in the conversation. Current generation voicemail products do very little, if anything, to identify the person that is leaving the message for the inmate. The prior art process is usually as follows, though some variations exist among providers:

1) friend/family member calls a toll-free number;
2) IVR provides the option for Voice Mail; this could be one of many options for the caller;
3) system checks that funds are available in the friend and family member's prepaid account (this process could occur in a different order);
4) once the Voice Mail option is selected, the following options may exist in the system:
   a) the system may check to see what inmates have called the caller; these would be the options/inmates that are offered to the caller to leave a Voice Mail;
   b) alternatively, the system may ask the caller to input the inmate ID of the inmate for whom the caller would like to leave a message; (Note that the system could theoretically search for the inmate as well, based on name, etc.)
5) caller leaves a Voice Mail up to a time limit (limits range typically from one to three minutes).

There is therefore a need for a system capable of accurately and automatically identifying the caller without the need for a formal enrollment process or specialized staff, and capable of ensuring that the same person(s) is talking throughout a call. in analysis.

SUMMARY

The detection system of the current disclosure provides capabilities for caller identification to and from secure facilities using natural speech without formal enrollment and without recognition of such a covert identification process by either the caller or the receiver. Previously-recorded calls are used to automatically create a Biometric Voice Print (BVP). By comparing a person's voice against BVPs stored in a biometric voice print database, that person's identity can be verified in a fully-transparent manner without the need for any active enrollment. The detection system can be used to verify the identity of persons both inside and outside the facility and to detect known persons-of-interest (POI) in subsequent calls. In at least one embodiment, a person with an existing voice-print can be automatically authenticated with high accuracy after only seven seconds of net speech. In another embodiment, a new BVP can be created for a person not previously known to the system after only 30 seconds of net speech. The disclosure also provides methods for using the system in secure facilities and for voicemail applications. The secure facility handling the call will be notified in real time if a caller is a known person inside the facility, a person-of-interest, a previous caller, or a new caller, all without the inconvenience of formal enrollment or multiple personal questions.

In at least one embodiment, the system may assist in the search for and monitoring of persons-of-interest (POIs) by instantly alerting security personnel once a POI has been identified.

In another embodiment, the system continuously ensures that the same persons are talking throughout the call and may generate an alert if another party is added to the call or one of the previously identified speakers is replaced.

The information system of the present disclosure is a data-centric platform for the identification of callers in secure facilities such as corrections facilities. The system can be deployed as a stand-alone application or as a module of a greater system.

The system platform provides unique information management and reporting services on communication activities between populations inside and outside the facility. It allows users to analyze patterns in the detection data and their relationship to various POIs.

One aspect of the present disclosure is the ability to aggregate recordings from multiple sites into a single, centralized location.

In an embodiment of the system, the BVP is continuously updated based on the new recordings. The quality of an initial BVP acquired during a first call may therefore be improved with information acquired during subsequent calls.

Another aspect of the information system of the present disclosure is that the speaker authentication is fully text independent and requires no prompting. The authentication process can therefore be conducted transparently without interrupting the flow of conversation.

Another aspect of the system is the ability to authenticate callers in any language.

Still another aspect of the present disclosure is the ability to authenticate callers from live calls or from pre-recorded calls.

Still another aspect of the present disclosure is the ability to authenticate callers against a previously generated BVP with as little as seven seconds of net speech.

Still another aspect of the present disclosure is the ability to reduce false positive acceptance rates to less than 0.1% with a positive acceptance rate greater than 90%.

Still another aspect of the present disclosure is that it can be used on any communication channel, such as a landline telephone, mobile, VoIP, microphone, satellite, etc.

Still another aspect of the present disclosure is that the system can monitor continuously the identities of persons on both ends of a call and can generate an alert if an identity changes on either end of the call.

Still another aspect of the system is that it is very robust for cross-channel authentication. It can create a BVP in a specific channel (a landline for instance) and then complete authentications from other, different channels (mobile, VoIP, or video/audio for instance).

In other aspects, the disclosed embodiments are directed to a method for passive enrollment and identification of one or more speakers in an audio file including automatically converting audio data to a format suitable for biometric processing, separating different channels present in the converted audio data separating speakers in the converted audio data, generating audio files specific to individual speakers in the converted audio data, iteratively grouping the audio files of individual speakers according to a predetermined matching criteria, creating biometric voice prints from the groups of audio files, and authenticating speakers in the biometric voice prints by comparing the biometric voice prints to entries in a biometric voice print database.

The audio data may include audio data originating from within and external to a secure facility.

The format suitable for biometric processing may be a Waveform Audio File format.

The predetermined matching criteria may include a speaker ID score determined from models of individual speaker's voices.

The method may also include assigning speaker identification records to biometric voice prints with authenticated speakers, and storing the speaker identification records and the biometric voice prints in the biometric voice print database.

The method may further include segregating selected speaker identification records and assigned biometric voice prints to one or more separate biometric voice print databases, and sharing the one or more separate biometric voice print databases among authorized individuals or agencies.

The method may still further include transcribing the audio files to a text format.

The audio files may be transcribed in any combination of automatically, on demand, and as the audio files are rendered.

Transcribing the audio files to a text format may include using an automatic language detection process to distinguish languages spoken by the speakers.

Transcribing the audio files to a text format may include using a language model, acoustic model, and pronunciation engine to compute hypotheses of words spoken in the audio files to determine a transcription result.

In further aspects, the disclosed embodiments are directed to a system for passive enrollment and identification of one or more speakers in an audio file including a processing engine including a processor and a memory including computer program code, the processing engine with the processor, memory, and computer program code configured to cause the system to: automatically convert audio data to a format suitable for biometric processing; separate different channels present in the converted audio data; separate speakers in the converted audio data; generate audio files specific to individual speakers in the converted audio data; iteratively group the audio files of individual speakers according to a predetermined matching criteria; create biometric voice prints from the groups of audio files; and authenticate speakers in the biometric voice prints by comparing the biometric voice prints to entries in a biometric voice print database.

The audio data may include audio data originating from within and external to a secure facility.

The format suitable for biometric processing may be a Waveform Audio File format.

The predetermined matching criteria may include a speaker ID score determined from models of individual speaker's voices.

The processing engine may be configured to cause the system to assign speaker identification records to biometric voice prints with authenticated speakers, and store the speaker identification records and the biometric voice prints in the biometric voice print database.

The processing engine may be further configured to cause the system to segregate selected speaker identification records to one or more separate biometric voice print databases and allow sharing of the one or more separate biometric voice print databases among authorized individuals or agencies.

The processing engine may be still further configured to cause the system to transcribe the audio files to a text format.

The processing engine may be yet further configured to cause the system to transcribe the audio files in any combination of automatically, on demand, and as the audio files are rendered.

The processing engine may be further configured to cause the system to transcribe the audio files to a text format using an automatic language detection process to distinguish languages spoken by the speakers.

The processing engine me be still further configured to cause the system to transcribe the audio files to a text format using a language model, acoustic model, and pronunciation engine to compute hypotheses of words spoken in the audio files to determine a transcription result.

BRIEF DESCRIPTION OF THE DRAWINGS

In the following detailed portion of the present disclosure, the embodiments disclosed herein will be explained in more detail with reference to the example embodiments shown in the drawings. These embodiments are non-limiting exemplary embodiments, in which like reference numerals represent similar structures throughout the several views of the drawings, wherein.

DETAILED DESCRIPTION

Figure 1:
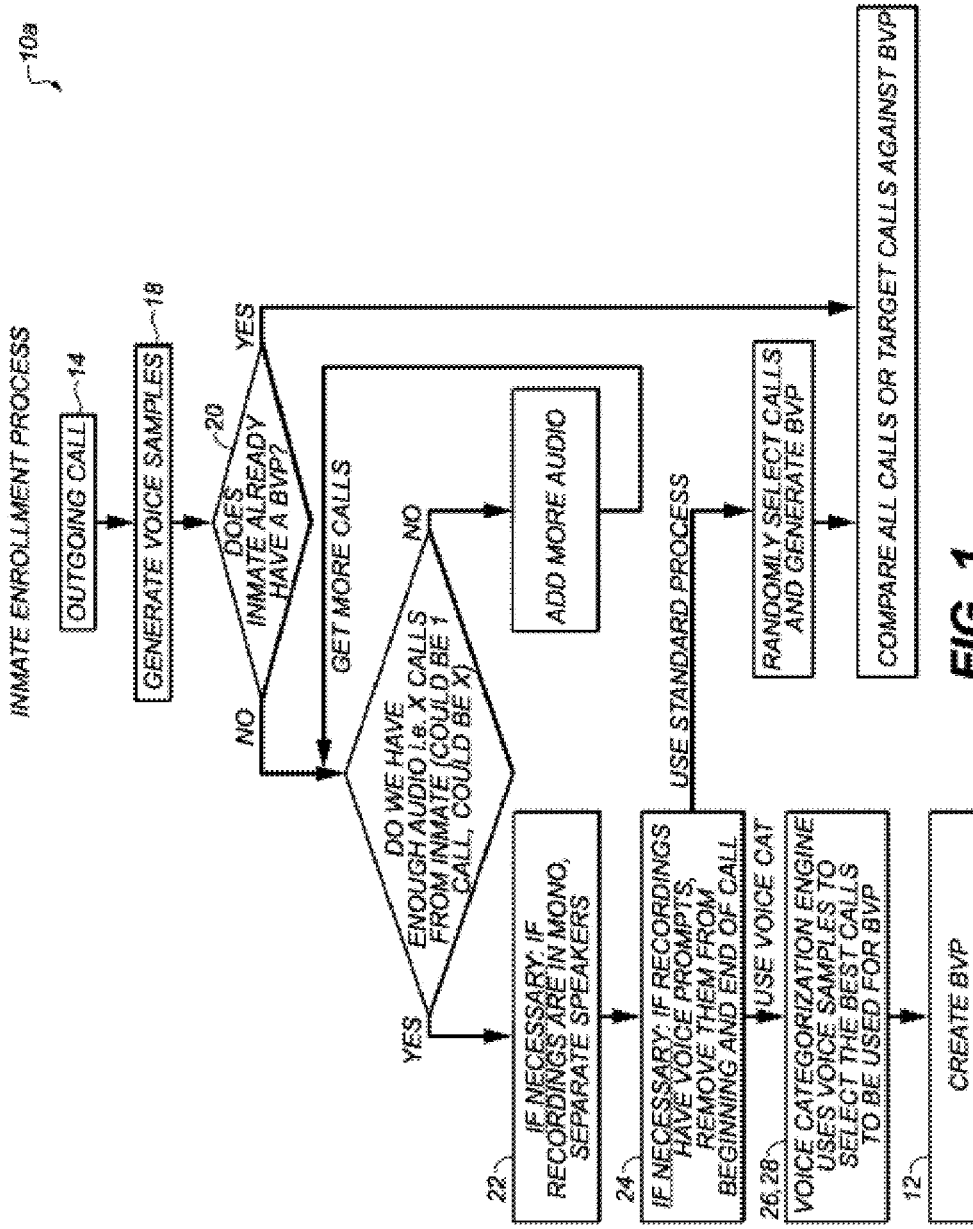
FIG. 1 is a schematic flow diagram showing an exemplary process in accordance with the disclosed embodiments for enrolling an inmate (inside) caller in the caller identification system.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

A novel system and method are disclosed to enroll and authenticate individuals inside and outside secure facilities using audio data in any format, for example, live or pre-recorded video, audio, or any other type of call or recording, originating from any source, for example, land line or wireless live calls, pre-recorded calls, voice mail messages, video or audio messages, and video or audio recordings of any type. The system and method may provide the ability to:

utilize any suitable audio format;

automatically convert the audio data to a format suitable for biometric processing;

separate different channels present in the audio data;

separate persons participating in the call, referred to as speakers, in the audio data;

create individual biometric voice print databases; and transcribe and index audio data for keyword searching.

The system and method may also provide the capability to continuously monitor the identity of one or more speakers in any audio format. The enrollment and authentication process, as described in greater detail hereinbelow, may be undetectable by the speakers.

The system cuts down on costs significantly since there is no need to formally enroll persons inside the facility, which typically requires substantial supervisor's time during the enrollment process. Further, the process is text and language independent. An initial BVP for a speaker may be generated from a segment of audio data having a predetermined length.

Some of the disclosed embodiments may have the ability to automatically create BVPs of POIs outside the facility. A system limited to authenticating POIs inside the secure facility alone would offer limited incremental value over other forms of authentication. The secure facility knows the general location of any inmate at all times and a caller from within the facility can only be one among a very limited set of possible candidates, depending on the housing breakdown. On the other hand, a real need for the facility is the ability to identify the individuals receiving outgoing calls from within the facility who could possibly be involved in a criminal activity in collusion with the inmates. The current disclosure describes an automated process to create BVPs for the caller as well as the called party in calls originating either inside or outside a facility, and to create BVP's from any source of audio data originating from inside or outside the facility.

In a world where a telephone number is largely meaningless for identification purposes, being able to authenticate callers by voice alone is a critical feature. Previous methods of the prior art, requiring a formal enrollment process of all callers, make this impossible. The process of the current disclosure makes authenticating by voice alone a reality by being able to use a recording to create a BVP of a new caller, and then to monitor caller identities during the remainder of a call.

1. Passive Enrollment of Speakers

In at least one embodiment, a high quality BVP can be generated from processing recordings of multiple calls.

In at least one embodiment, the system can process calls recorded at different times and from different numbers and may capture different characteristics of the caller's voice, training the system to recognize the caller in different circumstances, and produces a high-quality BVP.

2. Creation of a BVP without Formal Enrollment

In at least one embodiment, the system of the disclosure relies on a plurality of pre-recorded calls to create a BVP of a target speaker without formal enrollment. The BVP can also be produced during a live call.

Figure 2:
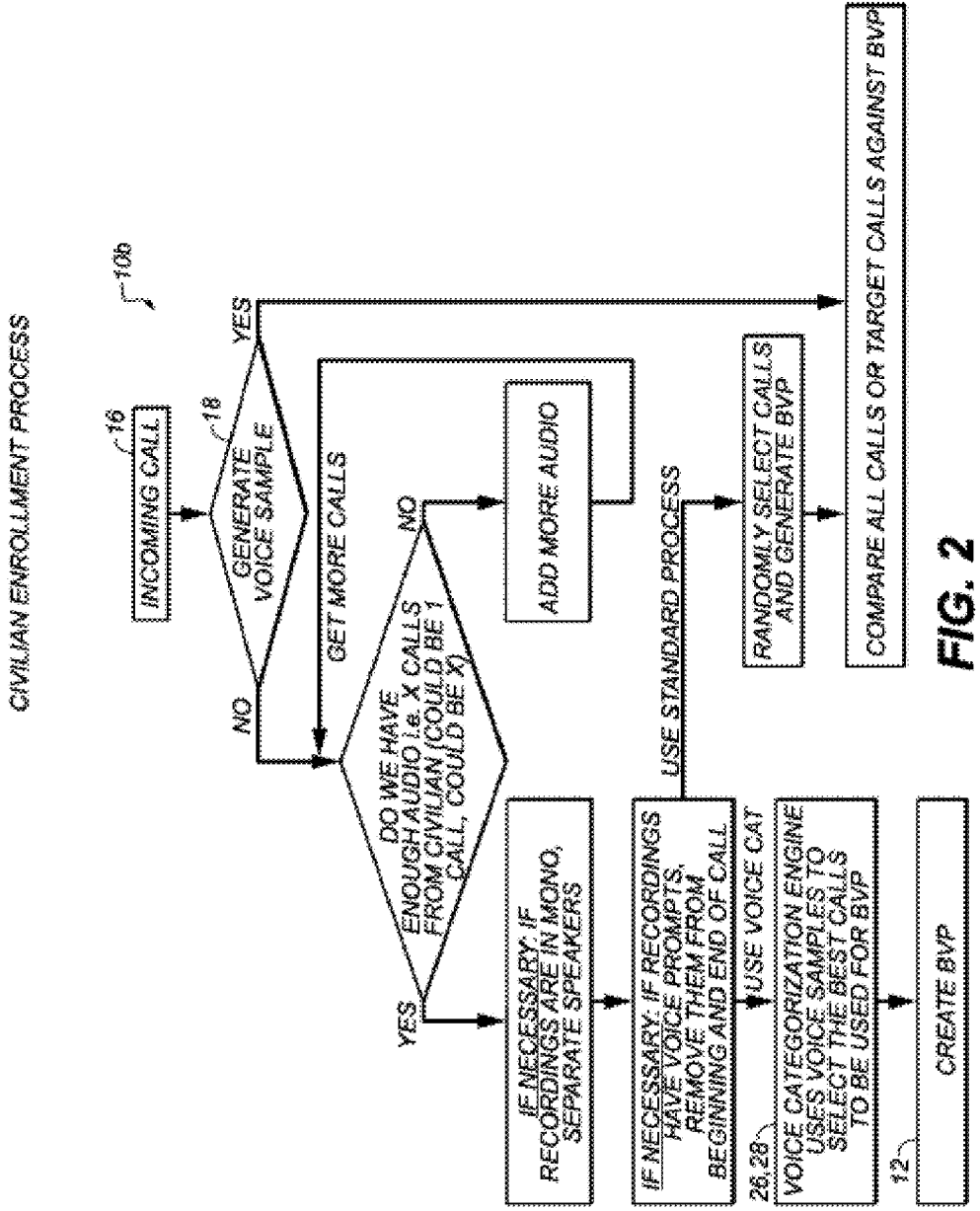
FIG. 2 is a schematic flow diagram showing an exemplary process in accordance with the disclosed embodiments for enrolling a civilian (outside) caller in the caller identification system.

Referring to FIGS. 1 and 2, an exemplary process 10*a*,10*b* for creating a BVP 12 is similar for either an inmate making outgoing calls 14 or a civilian making incoming calls 16 and comprises the steps of:
  a) downloading 18 at least one recorded call 20 from a target person;
  b) separating 22 the speakers in each recording through a speaker separation process;
  c) preprocessing 24 the calls to normalize volume, suppress silences, and reduce ambient noise, and trimming the beginning and end of each recording to remove telephone system prompts;
  d) selecting 26 a plurality of recording segments judged to have the highest quality; and
  e) processing 28 the selected segments to create a BVP for the target person.

3. Authentication of Incoming or Outgoing Speaker with Existing BVP

Figure 3:
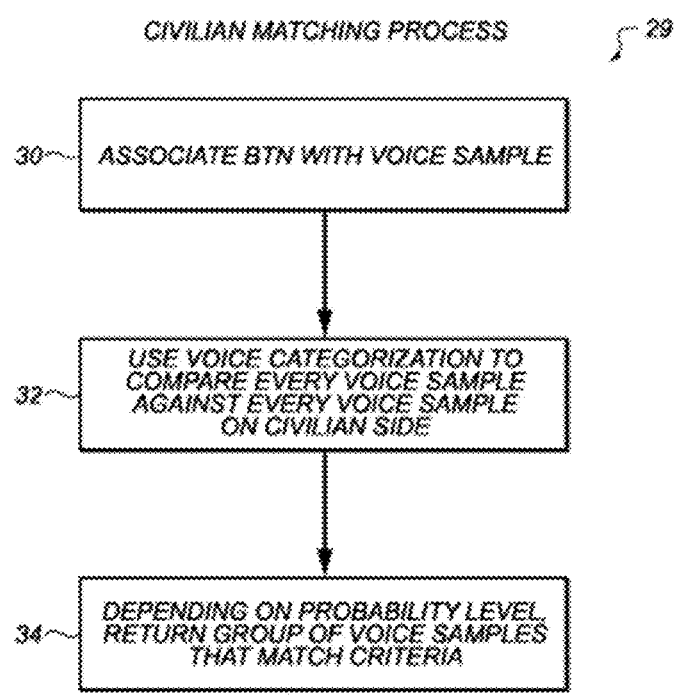
FIG. 3 is a schematic flow diagram showing how the system matches a civilian voice and associated billing telephone number via voice categorization to identify a civilian caller.

If a caller, e.g., a civilian caller 29 as shown in FIG. 3, has a BVP already stored in the system, at least one exemplary authentication process may include:
  a) uploading the call from the caller;
  b) associating 30 the Billing Telephone Number (BTN) with a voice sample of the caller;
  c) preprocessing the voice sample to normalize volume, suppress silence, and reduce ambient noise;
  d) separating the speakers in each recording through a speaker separation process to isolate a single speaker as the caller;
  e) trimming the beginning and end of the call to remove telephone system prompts;
  f) extracting at least seven seconds of net speech of the caller;
  g) using Voice Categorization 32 to process the extracted net speech by comparing every incoming voice sample against every voice sample existing in the civilian biometric voice print database; and
  h) matching 34 the speaker to a BVP by identifying all existing voice samples matched by the incoming voice sample.

The system may be able to identify one or both speakers during a call, which permits the system to operate in real time and to continue to confirm speaker identification throughout the duration of the call.

In another embodiment, the process may also be run in real time via Continuous Window Processing to determine throughout the length of a call whether any of the speakers have changed. An occasion where this is useful is if the inmate is on a watch list and the agency wants to know who is leaving him a voice mail in real time.

Figure 4:
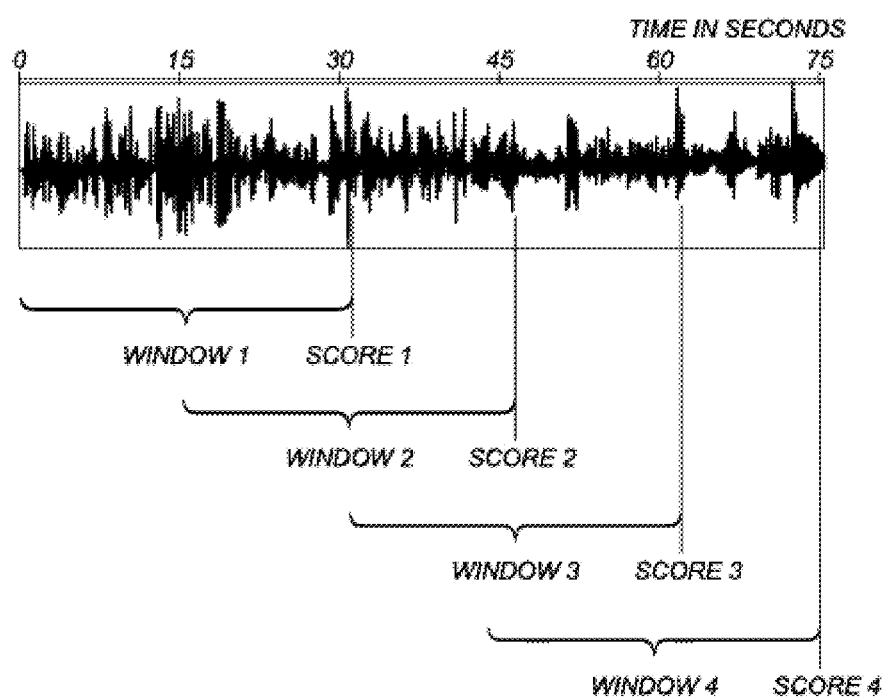
FIG. 4 is an exemplary voice print of a telephone call showing the use of overlapping windows of analysis to maintain voice identification throughout the call.

Referring to FIG. 4, the system may be able to be configured to process any desired length of time window of an incoming call to yield a voice ID score. For example, if the default time window size is 30 seconds, as shown in FIG. 4, the first voice ID score may be returned by the system 30 seconds into the call. However, the next window may be started 15 seconds into the call and may end 30 seconds later at 45 seconds into the call, generating a second voice ID score which may be compared to the first voice ID score generated 15 seconds previously. The overlap may ensure that during the call every second of the call may be used for speaker identification, e.g., FIG. 4 shows four overlapping 30 second windows 1 through 4 and voice ID scores 1 through 4 for a call of 75 seconds. In some embodiments the test windows may be of equal length. In one example the first test window is between 7 and 30 seconds in length, and said second test window begins between 3.5 and 15 seconds into the call.

4. Passive Enrollment of Outside Parties

One aspect of the current disclosure is the ability to create a BVP of a called party, whether inside or outside a facility, without the need for formal enrollment. In at least one embodiment, the voice print of every speaker is processed against the biometric voice print database. If no match is found, a trigger may automatically generate the creation of a new BVP. That person will be assigned by default the name of the called party, if known.

In another embodiment, a trigger for producing a BVP is based on the output from a data mining algorithm whose output is an Actionable Intelligence Potential (AIP) or Actionable Intelligence Score (AIS). The AIP/AIS is generated by mining the connections between the individual that has been called and other inmates/calls, emails, communications, financial transactions, etc. The trigger is based on one or more thresholds that can be adjusted as a function of the probability that the target speaker is a known Person of Interest (POI).

In another exemplary embodiment, a trigger to create a BVP is based on certain keywords identified either automatically or manually by an investigator listening to a phone call. The investigator can then request that the system create a BVP for the individual, if a BVP does not already exist, and begin the process of searching for those calls based on the individual's voice.

The identification process for this embodiment may include the following:

a) uploading the call of the called party;
b) preprocessing the call to normalize volume, suppress silences, and reduce ambient noise;
c) separating the speakers in each recording through a speaker separation process;
d) trimming the beginning and end of the call to remove telephone system prompts;
e) extracting at least seven seconds of net speech of the called party;
f) processing the net speech of the called party against the BVP database;
g) matching the called party to a BVP;
h) if no match is found, triggering the creation of new BVP from the call;
i) if less than 30 seconds of net speech is available from the call, searching the biometric voice print database for additional calls involving the called party;
j) if no other calls involving the called party can be found, then setting an alarm against the called party to use future calls to trigger creation of a new BVP; and running the biometric voice print database against newly created BVP.

This procedure may be followed in real time, defined herein as being on a live telephone call rather than a recorded call. The call is processed through a Session Initiation Protocol (SIP) server which analyzes the call. After 7 seconds of speech, the system can identify the caller.

In at least one embodiment, a cross-reference is kept of every incoming and outgoing telephone number against the BVPs of all inmates. Biometrics on voice mail recordings can be used, e.g., as follows:

1) identify the caller;
2) determine whether the caller is an ex-inmate/parolee (a POI);
3) alert the facility of a person of interest/under investigation who is leaving a voice mail;
4) identify instances of one caller using multiple numbers to leave VMs for the same inmate, or for multiple inmates.

5. Enhancement of BVPs

Enhancing an existing BVP over time may increase the identification accuracy of the BVP. A poor quality BVP will result in more false positive and false negative results. A BVP can be of poor quality for a number of reasons including, but not limited to one of the calls used to generate the BVP may erroneously include another speaker's voice, or the calls used were not of high quality to begin with, or more audio is needed to ensure that the BVP is of the highest quality. In some embodiments a proprietary algorithm automatically identifies BVPs that could use enhancement if they are consistently receiving poor identification scores. The system expects that if the correct person is being run against the BVP a certain threshold score should be attained; if it is not, the system flags the BVP for enhancement.

The enhancement can occur using multiple techniques. One exemplary method by which the algorithm enhances the BVP is by using a call that has been through the identification process and has been assigned an exceptionally high score. This indicates that this call is an excellent representative sample of the person that is being identified and, as such, should be used to improve the BVP. This enhancement will make future identifications better as well as the BVP is what drives the accuracy of the system. This method of improvement can be used over and over to improve the BVP.

An additional exemplary method is a scheduled process whereby the system, after a designated period of time (e.g., week, month, three months, six months, etc.) selects the highest scoring identified calls and uses them to improve the appropriate BVPs (a call identified with a very high score for a particular individual is used to improve that individual's BVP). This process automatically occurs during the designated periods, ensuring that the BVP continues to improve and be of high quality.

6. Cluster Matching of BVPs

There are circumstances where calls may have been assigned to a default identifier. This would be, for instance, when an outside speaker calls in, is unable to be identified, and is assigned to a particular calling number. The system may not be able to identify the speaker from the biometric voice print database. At a later date, the same speaker may call in and be personally identified. The original call assigned to the calling number is then reassigned to the newly identified speaker, forming a call cluster. Additional calls from this or other numbers identified as including this speaker may be added to the cluster with the goal of grouping the audio files by speaker. This may be accomplished by iteratively grouping the audio files based on a predetermined matching criteria, for example, speaker ID scores, until no more clusters may be merged or a particular stopping criteria is met, for example, different speakers from the same conversation may not be merged.

Figure 6:
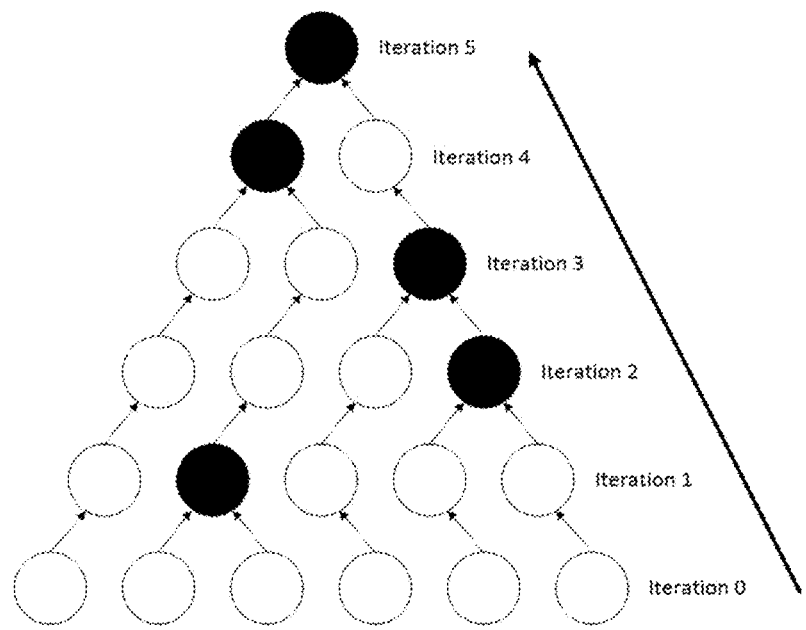
FIG. 6 shows an exemplary simple clustering where at each iteration, 2 files with the closest scores may be grouped.
Figure 7:
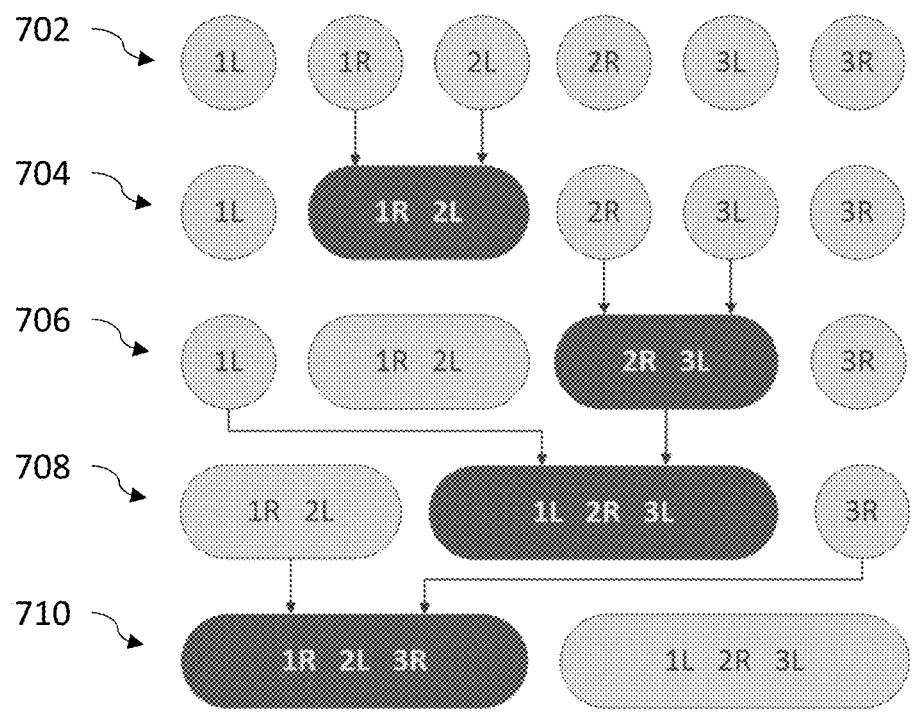
FIG. 7 depicts a more complex clustering scheme that may be implemented during enrollment.

FIG. 6 shows an exemplary simple clustering where at each iteration, 2 files with the closest scores may be grouped. FIG. 7 depicts a more complex clustering scheme that may be implemented during enrollment. In the first row 702, 3 calls are under consideration with speakers in left and right channels of each call. In the second row 704, the right channel speaker in call 1 and the left channel speaker in call 2 have speaker ID scores that meet a correlation threshold and are clustered together. In the third row 706, the right channel speaker in call 2 and the left channel speaker in call 3 have speaker ID scores that meet a correlation threshold and are clustered together. In the fourth row 708, the left channel caller in call 1 and the cluster of the right channel speaker in call 2 and the left channel speaker in call 3 have speaker ID scores that meet a correlation threshold and are clustered together. In the fifth row 710, the cluster of the right channel speaker in call 1 and the left channel speaker in call 2, and the right channel speaker in call 3 have speaker ID scores that meet a correlation threshold and are clustered together, resulting in two clusters. Provided that the correlation threshold ensures that the speakers are the same with an acceptable uncertainty factor, the clustering scheme should end with larger clusters of same speakers and smaller clusters of other speakers. Clustered biometric voice prints may be generated from the clusters of same speakers.

Figure 8:
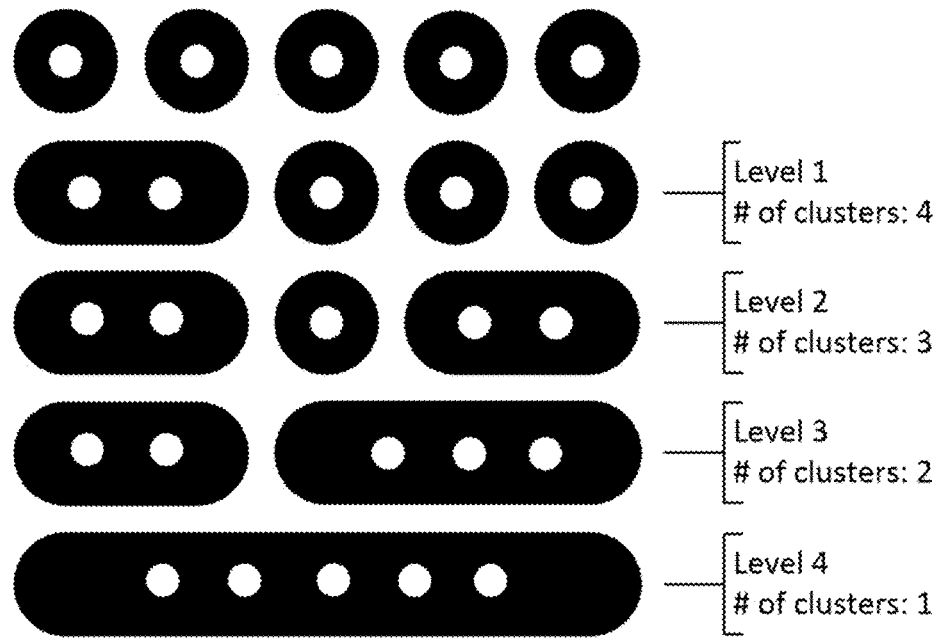
FIGS. 8 and 9 show examples of results of a general purpose clustering technique according to the disclosed embodiments.
Figure 9:
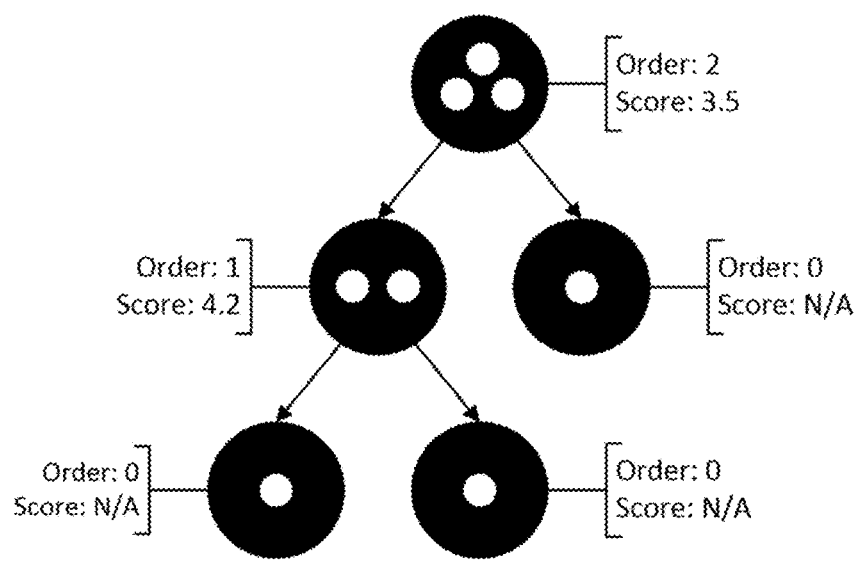

FIGS. 8 and 9 show examples of results of a general purpose clustering technique where the clustering proceeds without a stopping criteria but with the same correlation requirements. When merging is complete, the whole clustering tree is available for review and may be examined in various ways. For example, FIG. 8 shows a view by levels, where the clustering tree has 4 merge levels with decreasing numbers of clusters until at level 4 there is a single cluster. FIG. 9 shows a view from top to bottom as a binary tree.

The clustering process generally results in accurate clustering because it utilizes an everything against everything match and may be utilized in biometric voice print creation and incorporating speakers outside the secure facility into the biometric voice print database. The clustering process operates to automatically select audio files from within a pre-existing group of calls and select most appropriate audio files for biometric voice print creation based on the similarity of voice characteristics. The resulting biometric voice print is more accurate having been generated from a number of audio files with similar voice characteristics.

The clustering process incorporates speakers outside the secure facility into the biometric voice print database by clustering audio files with similar voice characteristics regardless of where the calls in the audio fields originate. Prior biometric identification systems generally ignore calls originating external to secure facilities due to technological challenges, and an inability to biometrically link internal and external speakers. The disclosed clustering technique allows for characterizing speakers regardless of whether they are internal or external. Exemplary applications include the ability to find outside speakers that are using multiple telephone numbers as well as to see how many outside speakers may be using a single telephone number. The introduction of a biometric identification for a speaker leaving a voice mail is invaluable for intelligence personnel and agencies. Often, the facility has a general idea of who should be tied to that number since the friends and family members often deposit funds for their loved ones in the prison and, in order to do so, must confirm their identity. This gives the process a starting point to match the person's voice to a telephone number. However, oftentimes there is no place to start in terms of identifying the caller. This is where proprietary software comes into use. Having the ability to voice print both sides of a call, the software can already have a voice associated with that number from previous calls to or from that number. The system then checks to see if the new voice print is a positive match. (Additionally, a voice mail is an excellent basis from which establish a voice print, as such a call is simply the person talking without interruption.) The system can create a BVP from the caller based on a voice mail and use it to identify the caller in the future. The biometric process can occur after the voice mail has been completed in an offline process. This can be the most efficient means of identifying the callers as each voice mail recording is run against the biometric voice print database of BVPs, and the identity with the accompanying score is returned.

Additional Embodiments

Further embodiments will now be disclosed that provide enrollment and authentication of individuals both inside and outside secure facilities using audio data in any format, for example, live or pre-recorded video, audio, or any other type of call or recording, originating from any source, for example, land line or wireless live calls, pre-recorded calls, video or audio messages, and video or audio recordings of any type. The disclosed embodiments may provide the ability to:

utilize any suitable audio format;
automatically convert the audio data to a format suitable for biometric processing;
separate different channels present in the audio data;
separate persons participating in the call, referred to as speakers, in the audio data;
create individual biometric voice print databases; and
transcribe and index audio data for keyword searching.

The disclosed embodiments may provide a user with enhanced capabilities within the disclosed systems and methods for managing biometric functions on audio sourced from both within and external to secure facilities.

Figure 5:
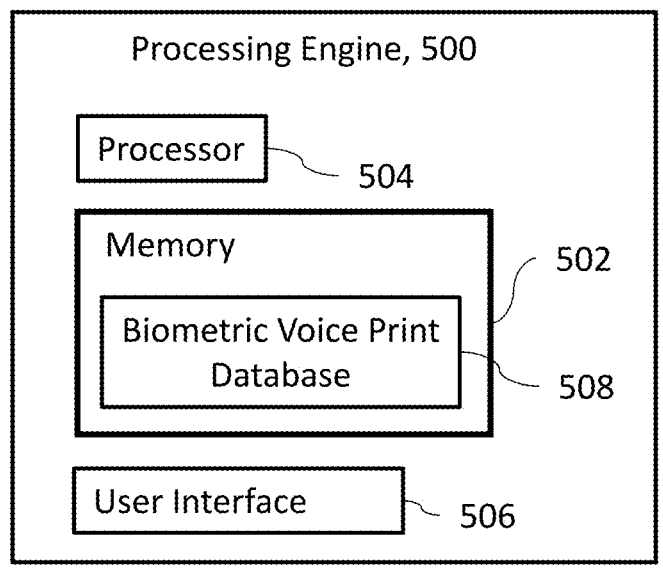
FIG. 5 illustrates an exemplary architecture of a processing engine for implementing the system and method disclosed herein.

FIG. 5 illustrates an exemplary architecture of a processing engine 500 for implementing the system and method disclosed herein and for performing the functions of the disclosed embodiments. The processing engine 500 may include computer readable program code stored on at least one computer readable medium 502 for carrying out and executing the process steps described herein. The computer readable program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or any other suitable programming languages. The computer readable program code may execute entirely on the processing engine 500, partly on the processing engine 500, as a stand-alone software package, partly on the processing engine 500 and partly on a remote computer or server or entirely on the remote computer or server. In the latter scenario, the remote computer may be connected to the processing engine 500 through any type of suitable network.

The computer readable medium 502 may be a memory of the processing engine 500. In alternate aspects, the computer readable program code may be stored in a memory external to, or remote from, the processing engine 500. The memory may include magnetic media, semiconductor media, optical media, or any media which is readable and executable by a computer. In some embodiments, the biometric voice print database 508 may be located in the memory of the processing engine 500. The processing engine 500 may also include a computer processor 504 for executing the computer readable program code stored on the at least one computer readable medium 502. In at least one aspect, the processing engine 500 may include one or more input or output devices, generally referred to as a user interface 506 which may operate to allow input to the processing engine 500 or to provide output from the processing engine 500, respectively. The processing engine 500 may be implemented in hardware, software or a combination of hardware and software. Furthermore, the processing engine 500 may have a single location, may be geographically distributed over a number of locations, or may be implemented as a cloud service.

As mentioned above, the disclosed embodiments may utilize audio files in any audio format. Some example formats may include OGG, FLAG, MP3, GSM, WAV, WAVPCM or any suitable format.

Upon acquisition of audio data, for example, from a phone call, video recording, or other source, a user may operate to provide the file to the processing engine 500 via, for example, a drag and drop method using the user interface 506 or by opening a default file management application. The processing engine 500 may operate to convert the file to a digital format if not already in a digital format and render the digital file in an uncompressed format that maintains the monophonic or stereophonic channelization, codified in a manner that meets conditions for voice biometric processing. For example, in some embodiments, the processing engine 500 may render a Waveform Audio File Format (.wav) file with a sample rate equal to or greater than 8 KHz and a resolution of at least 8 bits. The rendered digital file may be stored in the biometric voice print database 508 and indexed for future analysis. The rendered digital file may include a single monophonic channel or if stereophonic, the processing engine 500 may operate to separate the channels.

Channel separation may be accomplished using an audio processing program designed to recognize multiple channels within the audio file and generate separate additional files for individual channels. As a result, the original file may be kept intact and an additional file for each channel may be generated. The original and additional files may be indexed and stored in the biometric voice print database 508 The one or more channels may be analyzed to separate different participants, or speakers, in the digital file.

The processing engine 500 may perform a segmentation analysis where the channel may be analyzed for the presence of one or more speakers. The processing engine 500 may extract key datapoints and acoustic features from the speech of each individual speaker in the digital file, for example pitch, cadence, and tone, to generate a model comprising unique characteristics of an individual speaker's voice. The model may be used to determine a speaker ID score to which other biometric voice prints may be compared to determine whether the speaker ID scores meet a comparison threshold that indicates a match between biometric voice prints. In some embodiments, the segmentation analysis may be trained with an emphasis on conversations originating from equipment within the facility, may be language, accent, text, and channel independent, and may be audio source agnostic. The segmentation analysis may further operate to separate not only voices of individual speakers, but also to isolate silence, signaling and other noise inherent in the recording that could otherwise interfere with subsequent analysis, evaluation, listening, or other operations that may be performed on the contents of the biometric voice print database 508. The segmentation process results in the generation of a separate voice print file for each individual who speaks in the recording, independent of speech generated by other speakers, network signaling or noise. The number of speakers present in the recording may also be rendered as a potential point of interest.

The processing engine 500 may then transform the model into a matrix that can be stored as a voice print in the biometric voice print database 508 in the form of, for example, a binary file. If the identity of the speaker is known, the resulting voice print can then be assigned to the known speaker via a speaker identification record in the biometric voice print database 508. If the identity of speaker is not known, the resulting voice print may then be assigned to a default speaker, for example, Jaimie Doe, via a record in the biometric voice print database 508, and may be reserved for future identification. As mentioned above, the biometric voice print database 508 may be located in a memory of the processing engine 500.

The system may provide the user with the ability to create individual biometric voice print databases for later analysis, or may provide the user with the ability to create one or more custom indices of the biometric voiceprint database 508 related to speaker identities, key words, or any other fields or records of the biometric voice print database for later analysis, sharing biometric voiceprint database records among authorized individuals or agencies, or for other authorized uses.

In addition to having the capability of processing a wide variety of audio formats, the system may also provide robust transcription and indexing of audio files. Currently, particularly when interacting with correctional center communication systems, users have been limited to analyzing recorded calls within the correctional center communication systems for intelligence and biometric analysis. The disclosed embodiments provide additional investigative capability by introducing audio files with speakers located both internal and external to correctional facilities that may have initiated calls to, or received calls from, incarcerated speakers. Using the techniques described above, in addition to audio files with speakers internal to a correctional facility, audio files with external speakers may be converted to a format suitable for biometric processing, the converted files may be subject to segmentation analysis, voice print generation, speaker identification and assignment, and location in the biometric voice print database.

The transcription process may include on demand transcription of unique rendered digital files, transcription of all files automatically, transcription of audio files in real time as the audio files are rendered, automatic language detection; and keyword and topic searching. The user interface may provide a transcription menu or other selection process that allows a user to select one or more rendered digital files for transcription, or may allow automatic transcription of all rendered digital files after rendering to meet conditions for voice biometric processing.

The transcription process may include an automatic language detection process which operates to analyze speech in an audio file and distinguish the languages spoken by the speakers. The automatic language detection process provides the ability to offer notification, alerting and routing options based on the spoken languages, such as real time notification when a speaker utters certain words or phrases in a particular language and may deliver language based statistics that can be used for resource planning and other management level tasks at a facility implementing the system. The automatic language detection process may combine Gaussian Mixture Modeling (GMM) with sophisticated techniques applied through an iVector based system to generate condensed and highly representative models that are used to analyze spoken language and generate a quantitative score assigned to languages that may be pre-trained and packaged in the system. The spoken language may be determined based on a comparison of the quantitative scores in as little as a few seconds of recorded speech.

The transcription process generally provides speech-to-text or voice-to-text services. Upon conversion to text, the system may refine the text output by applying speaker segmentation analysis and identification where a biometric voice print is available and time alignment methods that delineate when one or another individual is speaking. Text formatting, and other adjustments are applied that improve the accuracy and readability of the output. The output may be stored and indexed in the voice print database 508 and made available on demand as a complete transcript of the audio file or in part via a keyword search tool (described below).

The transcription process may make use of a recognition network which may receive input from independent language models of details of specific words and how they are used in combination, and acoustic models that detail variations within language, e.g., UK English vs. US English, along with a pronunciation engine. The language model, acoustic model, and pronunciation engine inputs may be used collectively to compute hypotheses of words spoken in an audio file and decode all possible transcription results in weighted matrices, against which the most likely transcription result can be ascertained.

Transcription results may be made available in non-editable text and editable text formats, for example, PDF and DOCX, as some use cases require a wholly unbiased, machine-based output, and other use cases may require human editing of the transcription results to add emphasis, comments or other manual enhancements to the transcription results in an attempt to increase the usefulness of the transcription for a given readership.

Once transcribed, keyword indexing may enable investigators and administrative staff to manage challenges caused by the overabundance of data that would otherwise remain largely hidden in the audio files. This may be achieved by making the transcription results structured and text searchable. As a result, a user may accurately access key words and phrases within the context they were rendered when spoken.

Before keywords are indexed they may be extracted from the audio file using a term frequency-inverse document frequency method that may facilitate searching for and filtering transcripts from audio files that include specific topics. Keyword searching may be conducted in a single use, ad hoc manner or it can be "seeded" with a lexicon of default words, words spoken in a specific syntax, and phrases related to a given topic or context.

Some exemplary topics and phrases may include "Sexual Misconduct", "Threat Potential", and "Drug Related." The lexicons may be modified by the user to create custom and potentially shared templates from which notifications and alerts may be automatically generated when the established criteria is met. Some exemplary applications may include recognizing phrases such as "Call XXX-XXX0XXXX" which may indicate that a prohibited 3 way call may be attempted, and recognizing discussions about the weather that may indicate planning for unrest, disruptions, riots or escapes.

The disclosed embodiments advantageously facilitates user requests for biometric analysis of an audio file where a speaker is believed to be a current inmate, former inmate, an associate of a current or former inmate, a person promoting criminal activity, or generally a person of interest. For example, a user may upload an audio file which a speaker presents a threat to an emergency operator. The user may then request that the system identify the speaker from the pool of voice prints in the biometric voice print database 508 assigned to some or all speakers that meet certain criteria, such as inmates released over a specified time frame. As another example, the user may provide an audio file including speech from a person of interest and request the system return all calls that originate from the secure facility in which the person of interest is a speaker.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A method for passive enrollment and identification of one or more speakers in an audio file comprising:
    automatically converting audio data to a format suitable for biometric processing;
    separating different channels present in the converted audio data;
    separating speakers in the converted audio data;
    generating audio files specific to individual speakers in the converted audio data;
    iteratively grouping the audio files into clusters by speaker according to a predetermined matching criteria;
    creating biometric voice prints from the audio files of each cluster; and
    authenticating speakers in the biometric voice prints by comparing the biometric voice prints to entries in a biometric voice print database.

2. The method of claim 1, wherein the audio data includes audio data originating from within and external to a secure facility.

3. The method of claim 1, wherein the format suitable for biometric processing is a Waveform Audio File format.

4. The method of claim 1, wherein the predetermined matching criteria comprises a speaker ID score determined from models of individual speaker's voices.

5. The method of claim 1, comprising:
    assigning speaker identification records to biometric voice prints with authenticated speakers; and
    storing the speaker identification records and the biometric voice prints in the biometric voice print database.

6. The method of claim 5, comprising:
    segregating selected speaker identification records and assigned biometric voice prints to one or more separate biometric voice print databases; and
    sharing the one or more separate biometric voice print databases among authorized individuals or agencies.

7. The method of claim 1, further comprising transcribing the audio files to a text format.

8. The method of claim 7, comprising transcribing the audio files in any combination of automatically, on demand, and as the audio files are rendered.

9. The method of claim 7, wherein transcribing the audio files to a text format comprises using an automatic language detection process to distinguish languages spoken by the speakers.

10. The method of claim 7, wherein transcribing the audio files to a text format comprises using a language model, acoustic model, and pronunciation engine to compute hypotheses of words spoken in the audio files to determine a transcription result.

11. A system for passive enrollment and identification of one or more speakers in an audio file comprising:
    a processing engine including a processor and a memory including computer program code, the processing engine with the processor, memory, and computer program code configured to cause the system to:
    automatically convert audio data to a format suitable for biometric processing;
    separate different channels present in the converted audio data;
    separate speakers in the converted audio data;
    generate audio files specific to individual speakers in the converted audio data;

iteratively group the audio files into clusters by speaker according to a predetermined matching criteria;
create biometric voice prints from the audio files of each cluster; and
authenticate speakers in the biometric voice prints by comparing the biometric voice prints to entries in a biometric voice print database.

12. The system of claim 11, wherein the audio data includes audio data originating from within and external to a secure facility.

13. The system of claim 11, wherein the format suitable for biometric processing is a Waveform Audio File format.

14. The system of claim 11, wherein the predetermined matching criteria comprises a speaker ID score determined from models of individual speaker's voices.

15. The system of claim 11, wherein the processing engine is configured to cause the system to:
assign speaker identification records to biometric voice prints with authenticated speakers; and
store the speaker identification records and the biometric voice prints in the biometric voice print database.

16. The system of claim 15, wherein the processing engine is further configured to cause the system to:
segregate selected speaker identification records to one or more separate biometric voice print databases; and
allow sharing of the one or more separate biometric voice print databases among authorized individuals or agencies.

17. The system of claim 11, wherein the processing engine is further configured to cause the system to transcribe the audio files to a text format.

18. The system of claim 17, wherein the processing engine is further configured to cause the system to transcribe the audio files in any combination of automatically, on demand, and as the audio files are rendered.

19. The system of claim 17, wherein the processing engine is further configured to cause the system to transcribe the audio files to a text format using an automatic language detection process to distinguish languages spoken by the speakers.

20. The system of claim 17, wherein the processing engine is further configured to cause the system to transcribe the audio files to a text format using a language model, acoustic model, and pronunciation engine to compute hypotheses of words spoken in the audio files to determine a transcription result.

* * * * *